H. B. EMERSON.
MOTOR CONTROL SYSTEM.
APPLICATION FILED NOV. 13, 1907.
963,127.
Patented July 5, 1910.
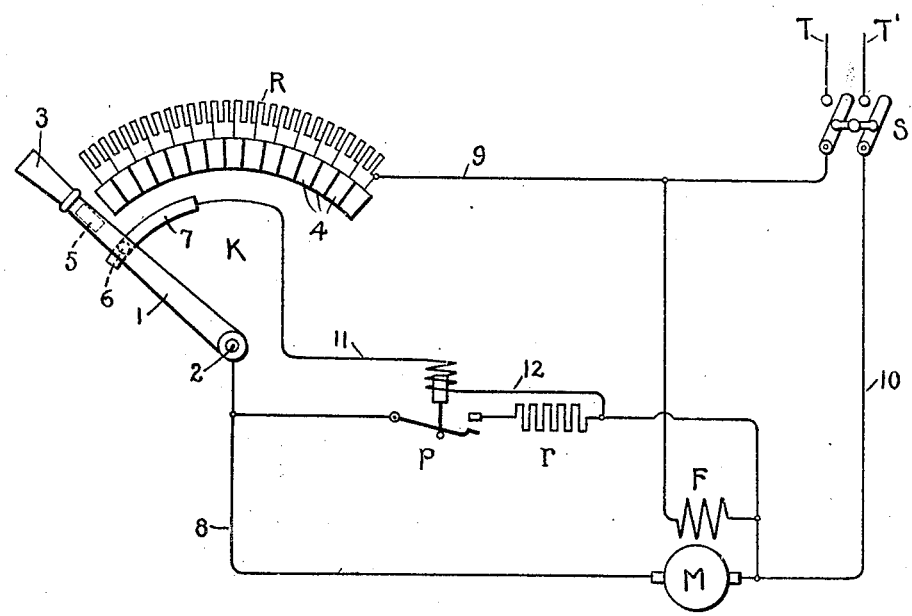
Witnesses
J. Earl Ryan
J. Ellis Glen
Inventor
Henry B. Emerson
by Albert G. Davis
Atty

UNITED STATES PATENT OFFICE.

HENRY B. EMERSON, OF SCHENECTADY, NEW YORK, ASSIGNOR TO GENERAL ELECTRIC COMPANY, A CORPORATION OF NEW YORK.

MOTOR-CONTROL SYSTEM.

963,127.   Specification of Letters Patent.   Patented July 5, 1910.

Application filed November 13, 1907. Serial No. 401,970.

*To all whom it may concern:*

Be it known that I, HENRY B. EMERSON, a citizen of the United States, residing at Schenectady, county of Schenectady, State of New York, have invented certain new and useful Improvements in Motor-Control Systems, of which the following is a specification.

My invention relates to motor control systems and is particularly intended for use with motor driven printing presses, although it may, of course, be used with other forms of apparatus.

In the operation of large printing presses it is often necessary to drive at a slow speed to permit passing of the web of paper through the press, or for what is generally called "threading". Presses are often so arranged that they may be connected up to operate either in whole or in part, or with or without certain attachments, and for this reason the load on the driving motor under these different conditions may vary greatly. It may happen therefore that while one of the early speed positions of the controller may give a threading speed to the press satisfactorily under certain conditions of the latter, the position of the controller will fail to give a suitable threading speed for other conditions of the press.

It is an object of my invention to provide means whereby when the controller is in a certain slow speed position it will cause the press to be operated at a certain speed suitable for threading irrespective of the condition of the press, or in other words, of the load on the driving motor.

Another object of my invention is to provide means whereby the motor, and therefore the press, may be braked automatically when the controller is thrown from its "on" to its "off" position.

More specifically stated, the objects of my invention are to provide means whereby when the controller is in a threading speed position the motor will be maintained at a certain speed, irrespective of the load, and when the controller is returned to its off position, for the purpose of stopping the motor or the press, the armature of said motor will have connected in shunt therewith a resistance, the circuit through which will be automatically opened when the motor has come practically to rest.

In order that my invention may be fully understood, I have shown diagrammatically in the drawing, which forms a part of this application, a simple system of motor control arranged according to my invention.

Referring to the drawing, T and $T^1$ represent the source of current supply, M the armature of the motor to be controlled and F the field thereof, and K a controller for said motor. The form of controller which I have illustrated is, of course, merely diagrammatic.

My invention may be used with any suitable form of controller whether of the type in which the proper connections are made directly by the hand operated device or the type in which said connections are made by separately actuated contacts controlled from a master switch.

My invention is in no way limited in its application to any particular form of controller, and I use this term in its broadest sense to include all kinds of motor control apparatus. The simple form of controller which I have illustrated will serve to make my control system clear to those skilled in the art, and it will at once be obvious how it may be adapted for any type of control apparatus.

In the form of controller shown, an arm 1 pivoted at 2 and having a handle 3 is arranged to move over a series of contacts 4 between which are connected sections of the resistance R in a well known manner. The arm 1 may be of conductive material and provided with a brush 5 for engagement with contacts 4. Said arm may also carry a brush 6 electrically connected thereto and arranged to engage a curved contact strip 7. This curved contact strip 7 is of such length that it will be engaged by the brush 6 while the arm 1 is in its "off" position, as shown, and while the arm is in its first few "on" positions. The arm 1 is connected to one side of the armature M by a wire 8, and one end of the resistance R is connected to one of the terminals of the double pole switch S by the wire 9. The other side of the armature M is connected to the other terminal of the double pole switch S by wire 10, and the field coil F is connected across the wires 9 and 10, as shown. A braking resistance $r$ is arranged to be connected in shunt to the armature M by an electromagnetic switch P, the actuating coil of which is connected at one end by a wire 11 to the contact 7 and at the other end by a wire 12 to one side of the armature as shown. The actuating coil of the switch P is therefore in the first few "on" positions of the controller connected in shunt to the armature of the motor and will, therefore, receive current depending in value upon the voltage across the armature of the motor. This actuating coil is so designed that the switch P will close when the voltage across the armature of the motor reaches the value corresponding to the desired low or threading speed of the motor and will open only when the circuit through its actuating coil is broken or the potential across the armature of the motor has dropped to a very low value corresponding to extremely low speed of the motor.

The operation of my device is as follows: The switch S being closed and the controller arm being advanced to its first speed position, current flows from T to $T^1$ through the field F which, as before stated, is in the case shown shunt connected, and current also passes from T through all of the resistance R, the first contact 4, brush 5, arm 1, wire 8, armature M, and wire 10 to the other side of the line $T^1$. The motor is thus energized but the current passing through its armature may or may not be sufficient to start it depending upon the load. If the load is heavy it may be necessary to advance the controller several steps before the motor starts. If it is desired to run the motor at a slow speed the arm 1 will not be moved so far as to disengage the brush 6 from the contact 7 which extends over the first few positions of the controller (in this case five) these being amply sufficient for starting the motor under all conditions and for giving it the desired speed. As soon as the motor beings to rotate, its counter-electromotive force begins to build up and the potential across the armature increases, thereby causing an increase in current flowing through the actuating coil of the switch P, which is connected in shunt to the armature M, through the wire 12 on one side and on the other side through wire 11, contact 7, brush 6, arm 1 and wire 8. When the speed of the motor and, therefore, the potential across its armature has reached a certain value, the current through the actuating coil of the switch P will be sufficient to operate the same which when closed will connect the braking resistance r in shunt to the armature. This braking resistance will serve in a manner well understood to prevent the motor from exceeding a certain definite speed and will hold it at this speed under wide variations of load. When it is desired to bring the motor to its regular speed for the usual operation of the apparatus which it drives, the controller may be moved on to the desired or full speed position. When the brush 6 leaves the contact 7 the circuit through the actuating coil of the switch P will be broken and this switch will open, thereby interrupting the circuit through the braking resistance r and allowing the motor to run at the desired speed. In stopping the motor, when the controller is thrown to its off position as soon as the brush 6 engages with the contact 7 the switch P will be again closed and the braking resistance connected in shunt to the armature. As has been stated, this switch P may be so designed that it will remain closed until the current through its actuating coil has fallen to very nearly nothing. If, therefore, when it is desired to stop the motor the handle 3 is thrown back to its "off" position, the switch P will close and connect the braking resistance r in shunt to the armature, a condition which will be maintained until the motor has practically ceased to rotate. In this way the resistance r not only serves to limit the speed of the motor when desired, but also to brake the motor when stopping the same.

What I claim as new and desire to secure by Letters Patent of the United States, is,—

1. In combination a motor, a resistance, a controller for connecting the motor to a source of current supply through said resistance and for regulating the amount of resistance in the circuit, a braking resistance, and means responsive to the potential across the motor armature for connecting said braking resistance in shunt to the motor armature in a slow speed position of the controller.

2. In combination a motor, a resistance, a controller for connecting said motor to a source of current supply through said resistance and for regulating the amount of resistance in the circuit, a braking resistance, and means operative in a slow speed position of the controller for connecting said braking resistance in shunt to the motor armature if the speed of the motor exceeds a certain value.

3. In combination a motor, a resistance, a controller for connecting the motor to a source of current supply through said resistance and for regulating the amount of resistance in the motor circuit, a braking resistance, and means operative in a slow speed position of the controller for connecting said braking resistance in shunt to the motor armature if the voltage across the armature of the motor exceeds a certain value.

4. In combination a motor, a resistance, a controller for connecting the motor to a source of current supply through said resistance and for regulating the amount of said resistance in the circuit, a braking resistance, and means operative when the controller is in its off and slow speed positions for connecting said braking resistance in shunt to the motor armature if while the controller is in these positions its speed exceeds a certain value, said means acting when the controller is thrown to its off position to retain said braking resistance in shunt to the armature until the speed of the motor has dropped much below that at which said means was first operated.

5. In combination a motor, a resistance, a controller for connecting the motor to a source of current supply through said resistance and for regulating the amount of resistance in the circuit, a braking resistance, and means operative when the controller is in its off and slow speed positions for connecting said braking resistance in shunt to the motor armature if while the controller is in these positions the voltage across the armature of the motor exceeds a certain value, said means acting when said controller is thrown to its off position to retain said braking resistance in shunt to the armature until the speed of the motor has dropped much below that at which said means was first operated.

6. In combination a motor, a resistance, a controller for connecting the motor to a source of current supply through said resistance and for regulating the amount of said resistance in the circuit, a braking resistance, an electromagnetic switch for connecting said braking resistance in shunt to the motor armature, and means operating with the controller for connecting the actuating coil of said electromagnetic switch in shunt to the motor armature while said controller is in a slow speed position.

7. In combination a motor, a resistance, a controller for connecting the motor to a source of current supply through said resistance and for regulating the amount of said resistance in the circuit, a braking resistance, an electromagnetic switch for connecting said braking resistance in shunt to the motor armature, and means operative when the controller is in its off and slow speed positions for connecting the actuating coil of said electromagnetic switch in shunt to the motor armature.

8. In combination a motor, a resistance, a controller for connecting said motor to a source of current supply through said resistance and for varying the amount of resistance in the circuit, a braking resistance, an electromagnetic switch for connecting said braking resistance in shunt to the motor armature, said switch being designed to remain closed after having once operated until the current through its actuating coil has fallen to practically nothing, and contacts on the controller for connecting the actuating coil of said electromagnetic switch in shunt to the motor armature while said controller is in a slow speed position.

9. In combination a motor, a resistance, a controller for connecting said motor to a source of current supply through said resistance and for varying the amount of resistance in the circuit, a braking resistance, an electromagnetic switch for connecting said braking resistance in shunt to the motor armature, said switch being designed to remain closed after having once operated until the current through its actuating coil has fallen to practically nothing, and contacts on the controller for connecting the actuating coil of said electromagnetic switch in shunt to the motor armature while said controller is in its off and slow speed positions.

In witness whereof, I have hereunto set my hand this 12th day of November, 1907.

HENRY B. EMERSON.

Witnesses:
  BENJAMIN B. HULL,
  HELEN ORFORD.